Oct. 30, 1951     R. G. ATKINSON     2,572,829
COAL GASIFICATION PROCESS AND APPARATUS
Filed Dec. 28, 1948
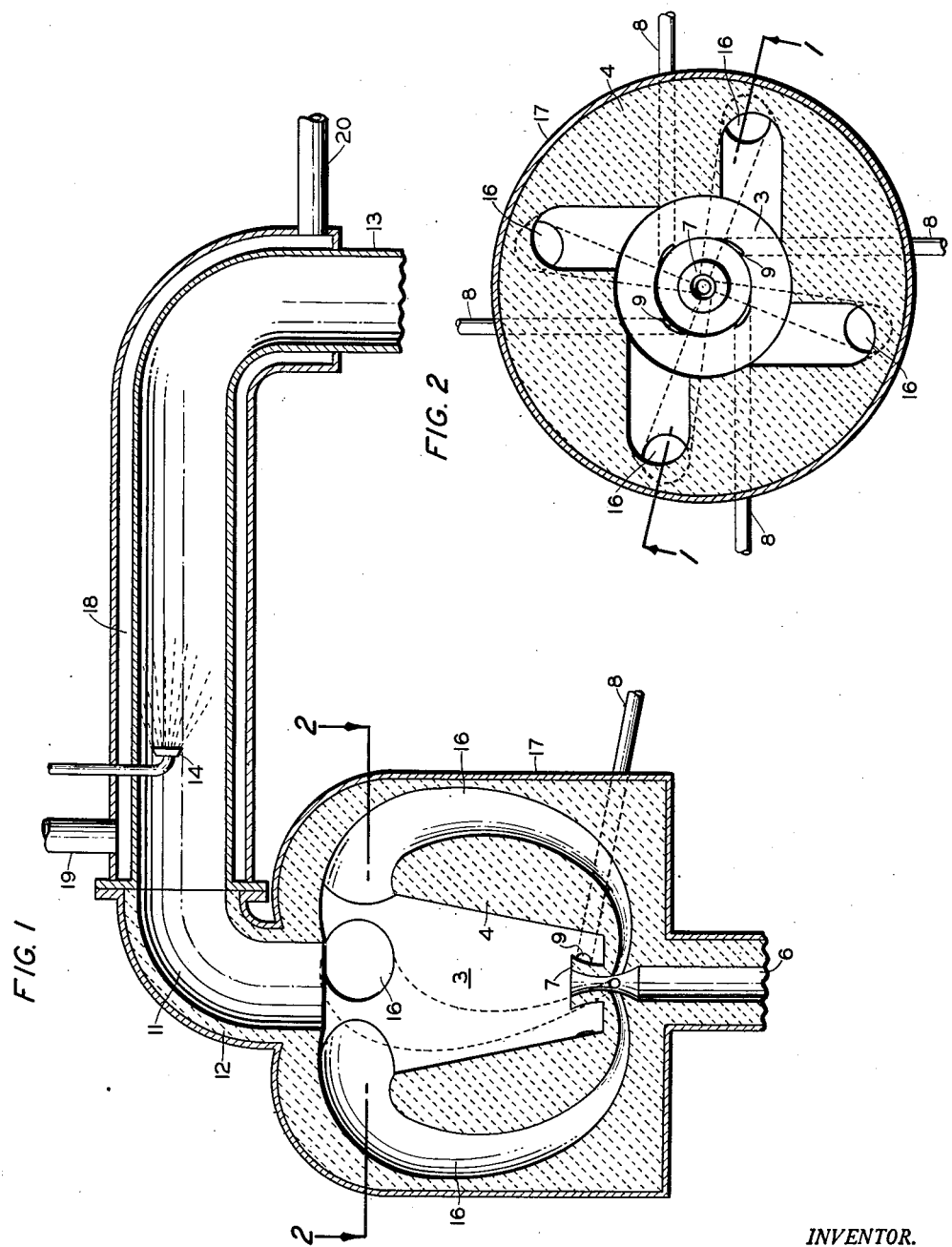
INVENTOR.
R. G. ATKINSON
BY Hudson & Young
ATTORNEYS Patented Oct. 30, 1951

2,572,829

UNITED STATES PATENT OFFICE 2,572,829

COAL GASIFICATION PROCESS AND APPARATUS

Robert G. Atkinson, Bartlesville, Okla., assignor to Phillips Petroleum Company, a corporation of Delaware Application December 28, 1948, Serial No. 67,735

12 Claims. (Cl. 48—63)

This invention relates to a process for gasifying carbonaceous materials. In a more specific aspect, it relates to a process for manufacturing a mixture of carbon monoxide and hydrogen. In another specific aspect, it relates to a high temperature process for gasifying coal. In still another specific aspect, it relates to an apparatus for the high-temperature gasification of coal. In yet another aspect, it relates to a method of protecting the refractory lining of a high temperature reactor from heat radiations.

For a number of years, the manufacture of mixtures of carbon monoxide and hydrogen has been carried out by a fixed bed process, in which a reactor charged with coal is blown by a stream of air to oxidize a portion of the coal and heat the bed to incandescence, after which time the air is shut off and steam is passed into the heated bed. Only that portion of the gases generated by the reaction of steam with the incandescent carbon is captured for use. The reactions which occur during the passing of steam through the incandescent bed are highly endothermic and the bed is soon cooled to the point that further reaction does not occur and it is necessary to stop the flow of steam and heat the bed by passing air through again. This method is very inefficient because so much of the heat and carbonaceous material is lost during the regenerating step. The gas produced which usually contains some carbon dioxide is commonly called water gas and will be referred to hereafter as such.

Attempts have been made to manufacture water gas by the reaction of finely-divided coal with steam and oxygen in a fluidized bed. However, this method is limited because the refractory materials from which furnaces are presently built will not satisfactorily stand the high temperatures which are necessary for the efficient operation of the process at high capacities.

I have discovered a method by which it is possible to attain the high temperatures desirable in the manufacture of water gas by gasifying pulverized coal with steam and oxygen. I have also invented an apparatus which is suitable for carrying out the high temperature gasification of pulverized carbonaceous material at high capacity.

It is, therefore, an object of my invention to provide a method for the gasification of carbonaceous material.

It is another object of my invention to provide a method for the manufacture of water gas.

It is another object of my invention to provide a high-temperature process for the gasification of coal.

It is another object of my invention to provide a method for protecting the refractory walls of a high-temperature gasification apparatus.

It is still another object of my invention to provide a furnace which is adapted to the carrying out of high-temperature coal-gasification reactions.

Other objects and advantages of my invention will be apparent to those skilled in the art upon reading the following drawing, description and claims.

In the drawings,

Figure 1 is a cross sectional view of my apparatus for carrying out high-temperature coal-gasification.

Figure 2 is a transverse cross sectional view of my apparatus taken along the line 2—2 of Figure 1.

In Figure 1, leading into the smaller end of the frusto-conical reaction chamber 3 within a mass of refractory material 4 is a reactant inlet 6 which terminates just inside the reaction chamber in a venturi 7. A plurality of blanketing mixture conduit lines 8 lead into the reaction chamber through tangential ports 9 which are positioned in the sidewall of the reaction chamber at its smaller end adjacent the reactant inlet line 6. These blanketing mixture inlet lines enter the reaction chamber in a direction tangential to the sidewall and generally normal to the longitudinal axis of said chamber. Directly opposite the reactant inlet line 6, which is pointed in a direction along the longitudinal axis of said chamber, is a product outlet conduit 11 which is lined with a refractory material 12 to the point at which said conduit is joined by a water jacketed extension 13. A quenching spray 14 enters the jacketed section just downstream from the point of juncture with the refractory-lined section. Leading from the reaction chamber tangentially at spaced intervals around the sidewall adjacent the outlet end are a plurality of dust return ducts 16 which follow a downward course and terminate at their lower ends in the throat of the venturi 7. Instead of a venturi, any suitable device which will produce a jetting action may be substituted. A suitable cooling liquid may be circulated through jacket 18 through inlet and outlet lines 19 and 20.

In Figure 2, the positions of the blanketing mixture conduits 8 are shown as well as the location of the return ducts 16. Number 3 is the frusto-conical reaction chamber with the inlet venturi 7 and the tangential ports 9 more clearly shown. Number 17 is a metal sheath surrounding the refractory material.

Operation

In the gasification of coal for the manufacture of synthesis gas, there occur at least one oxidation reaction and at least three reduction reactions, which are represented by the following equations:

$$C+O_2=CO_2$$
$$C+CO_2=2CO$$
$$C+H_2O=CO+H_2$$
$$C+2H_2O=CO_2+2H_2$$

In addition to these, another reaction, known as the water gas shift occurs as follows:

$$CO+H_2O=CO_2+H_2$$

The rates of all of these reactions rise with a rise in temperature. The oxidation reaction evolves large amounts of heat and except at very high temperatures, its equilibrium lies far to the right. The reduction reactions absorb heat and their equilibria lie far to the left except at very high temperatures. In present methods and apparatus, the temperatures attainable are not sufficiently high to produce high yields of reduction products particularly carbon monoxide. The oxidation reaction proceeds at a rate faster than the reduction reactions throughout the ordinary operating range of temperatures.

In a fixed bed type of reactor, the carbon bed is brought to a high temperature by passing air therethrough and oxidizing a sufficient amount of the carbon to raise the temperature. The gases from this reaction are discarded. For a short time, it is possible to pass steam through the incandescent bed and produce synthesis gas. However, since no heat is being applied during the latter step, the temperature is quickly reduced and has to be built up by oxidizing more of the carbon. This process is wasteful and inefficient.

By using the fluidized technique, it is possible to carry out both the oxidation and reduction reactions simultaneously. In this process, the heat is generated and substantially simultaneously absorbed. This makes possible a closer control of the temperature within the reactor. In order to carry out this process, it is necessary that the heat generated by the oxidation reaction be immediately dissipated or else the temperature of the carbon particles increases and combustion of the particles becomes complete. By carrying out the process in such a way that the reduction and oxidation reactions occur at substantially the same point in place and time, control of the process is much easier.

Extremely high temperatures, in the range of 900° C. or above, are necessary in order that the reduction reactions proceed at a satisfactory rate and reach a satisfactory equilibrium. In the processes previously used, the amount of carbon monoxide obtained has been too low and the amount converted to carbon dioxide has been much higher than desired or permissible. The reason is that apparatus which will withstand the temperatures necessary for high efficiency is not available for high output processes. By increasing the temperature of the reaction zone it is possible to attain much higher yields of the desired products.

I have discovered a method by which it is possible to operate at high temperatures without serious damage to the refractory walls. I have also invented an apparatus for carrying out my method of operation. In this invention, I protect the walls of the furnace by surrounding them with a blanket of a high-emissivity, finely-divided solid suspended in a high emissivity gas. The latter is desirably an endothermic gas-making fluid containing oxygen, and is preferably steam or $CO_2$. In carrying out my method of operating, it is necessary that the furnace be generally cylindrical or conical in shape in order that the furnace walls have a generally circular transverse cross section to permit the passage of a blanket of gas and suspended solid around the periphery of the furnace without any substantial mixing with the reactants in the center portion of the furnace.

In my invention, I prefer to use a generally frusto-conical furnace, the outward taper of the sidewalls being such that the cross-sectional area increases as the volume of gaseous products within the furnace increases, thereby permitting the flow of gases through the furnace at a constant velocity. In my furnace, I introduce the reactants, which in this case are finely divided coal, steam, and free oxygen through a reactant inlet positioned in the center of the smaller end-wall in a direction along the longitudinal axis of the furnace. In the larger end-wall, I have an outlet port of larger diameter than the inlet port, the size of this outlet port being such that the products will leave the furnace without any substantial change in velocity. Simultaneously, I introduce into the furnace through a port in the sidewall adjacent the reactant inlet in a direction tangential to the sidewall and generally normal to the longitudinal axis a mixture of finely divided coal and a high-emissivity gas, preferably, steam or carbon dioxide. This tangentially-introduced mixture is introduced at such a velocity and in such amount that it is maintained by centrifugal force adjacent the whole inner surface of the reactor sidewall, thus forming a separating layer of finely-divided carbon and high-emissivity gas between the sidewall and the reaction zone in the center. This provides a blanket to shield the sidewall from heat radiation and in accomplishing this, the suspended finely-divided coal is heated to a temperature only slightly below the reaction temperature. I have provided a series of outlets in the sidewall adjacent the product outlet port for removing the suspended solid in gas. Each port is the opening of a generally curved duct which leads back into the reactant inlet line at the throat of the venturi. In the drawing, I have shown a furnace having four such ducts. It is obvious that more or fewer may be used as appears desirable and that instead of having separate openings, an annulus may be provided at the outlet end. These ducts should follow a generally curved path in order that there be no sharp turns or obstructions to interfere with the free passage of material therethrough. To provide greater suction on the coal-dust return ducts, I prefer to use a venturi as a reactant inlet with the air ducts entering the inlet line into the throat of the venturi.

While it is desirable, from the standpoint of economy, to minimize the loss of heat from the system insofar as practical, it may, under certain circumstances, be desirable to cool the furnace walls. One method is to provide ducts for passing a cooling fluid around the reaction chamber. This or any equivalent cooling means is fully within the scope of my invention.

In the drawing, I have shown a furnace having four tangential inlets for introducing the blanketing coal-dust and high-emissivity gas.

Obviously the number of such ducts is not critical and more or fewer may be used.

Finely divided coal has a high emissivity and is, therefore, an excellent material for protecting the walls. Since steam is a high-emissivity gas and steam must be used in the reaction, I prefer to use a mixture of steam and coal for protecting the furnace walls. By operating in this manner, it is possible to provide a high degree of protection for the walls and simultaneously preheat at least a portion of the reactant materials. It is preferable to introduce only oxygen and whatever additional amount of steam is desired through the inlet line in addition to the recycle steam and powdered coal entering through the coal dust return ducts. A reactor temperature above 750° C. should be maintained.

By using a furnace of increasing diameter from the inlet to the outlet end, it is possible to introduce a blanketing mixture into the furnace to follow a spiral path around the sidewalls and at the same time, introduce a reactant mixture along the longitudinal axis of the furnace and attain a substantially rod-like flow of reaction products through the furnace without any substantial amount of mixing of blanketing gas with reactant material or product and without any substantial change in the velocity of the gases moving therethrough.

In my apparatus, I have shown a refractory lined product take off line, which is joined by a water jacketed extension in the upsteam end of which is a water spray for providing additional cooling.

My apparatus and process permits operation at temperatures substantially above those attainable in other furnaces. The type of refractory material used is not too critical, although I prefer to use a good material, such as zirconia bricks, since it is an excellent refractory and the walls must be able to withstand fairly high temperatures, even when practicing my invention.

While I have described a coal gasification process in connection with my invention, it is to be understood that any carbonaceous material may be used as a feed. It may be desirable to coke certain types of coal and pass the coke through my furnace.

While I have shown and described a furnace having provisions for introducing and removing the blanketing material tangentially, it may be advantageous to provide inlet and outlet annuli concentric with the reactant inlet and product outlet ports for introducing the blanketing material in a direction parallel with the side walls of the reactor. The outlet annulus would be a collecting ring from which the return ducts would take off as slightly flattened horns.

All of the described modifications are fully within the purview of my invention, the scope of which is defined by the following claims.

I claim:

1. The process for gasifying a carbonaceous material in a reaction chamber of generally circular transverse cross section which comprises introducing into said reactor in a direction parallel to the longitudinal axis through a reactant inlet port in one end of said reactor a mixture of the finely divided carbonaceous material, free oxygen, and steam; maintaining a reactor temperature above 750° C.; simultaneously passing into said reactor through a port adjacent the reactant inlet a suspension of the finely divided carbonaceous material and an endothermic gas making fluid containing oxygen, said suspension being introduced into said reactor in a direction and in sufficient quantity as to be maintained adjacent the whole inner surface of the reactor sidewall, thus forming a separating layer of said finely-divided solid and gas between said sidewall and the reaction zone in the center of said chamber, thereby shielding the walls of said reaction chamber from the heat radiations from the reaction zone and simultaneously preheating said finely divided carbonaceous material; removing the gaseous reaction products from said chamber; removing the mixture of finely-divided carbonaceous material and suspending-gas from said chamber and reintroducing said mixture together with a free oxygen-containing gas into said chamber through the reactant inlet port for conversion into gaseous products.

2. The process of claim 1 wherein the endothermic gas making fluid containing oxygen is steam.

3. The process of claim 1 wherein the endothermic gas making fluid containing oxygen is carbon dioxide.

4. The process for gasifying coal in a reaction chamber of generally circular transverse cross section which comprises introducing into said reactor in a direction parallel to the longitudinal axis through a reactant inlet port in one end of said reactor, a mixture of the finely divided coal, free oxygen and steam; maintaining a reactor temperature above 750° C.; simultaneously passing into said reactor through a port adjacent the reactant inlet a suspension of the finely-divided coal and an endothermic gas making fluid containing oxygen said suspension being introduced into said reactor in such a direction and in sufficient quantity as to be maintained adjacent the whole inner surface of the reactor sidewall, thus forming a separating layer of said finely-divided solid and gas between said sidewall and the reaction zone in the center of said chamber, thereby shielding the walls of said reaction chamber from the heat radiations from the reaction zone and simultaneously preheating said finely divided coal; removing the gaseous reaction products from said chamber; removing the mixture of finely-divided coal and suspending-gas from said chamber, and reintroducing said mixture together with a free oxygen-containing gas into said chamber through the reactant inlet port for conversion into gaseous products.

5. In the process for gasifying coal by the reaction of finely-divided coal with oxygen and steam at a temperature above 750° C. in a furnace of generally circular transverse cross section having a reactant inlet port in one end and a product outlet port in the opposite end, the improvement comprising introducing into said furnace, through a tangential port in the sidewall adjacent said inlet port in a direction tangent to the sidewall and generally normal to the longitudinal axis thereof, a gaseous suspension of finely-divided coal and steam at a sufficiently high velocity and in sufficient quantity as to be maintained adjacent the whole inner surface of the sidewall thus forming a separating layer of said finely-divided coal and suspending gas between said sidewall and the reaction zone in the center of said furnace, thereby shielding the walls of said furnace from heat radiations and simultaneously preheating the finely-divided coal and steam, removing the reaction products through said product outlet port, removing the preheated coal and steam through another port adjacent the product outlet port, passing said preheated coal and steam together with a free oxygen-containing gas into said chamber through the reactant inlet port for conversion into gaseous products.

6. The process for gasifying coal which comprises passing a reaction mixture of finely divided coal, oxygen, and steam into a frusto-conically shaped reaction chamber through a reactant inlet in the smaller end of said chamber in a direction parallel to the longitudinal axis thereof; maintaining in the center of said chamber a reaction temperature above 750° C.; removing the gaseous reaction products through an outlet port in the large end of said reaction chamber; simultaneously introducing into said chamber through a tangential port in the sidewall adjacent the reactant inlet port in a direction tangent to said sidewall and generally normal to the longitudinal axis thereof a gaseous suspension of finely divided coal and steam at a sufficiently high velocity and in sufficient quantity as to be maintained as a layer adjacent the whole inner surface of said sidewall between said sidewall and the reaction zone in the center, thereby shielding the reactor sidewalls from heat radiations and simultaneously preheating the suspended coal and steam mixture; removing said preheated mixture from said reaction chamber and reintroducing it together with free oxygen-containing gas through said reactant inlet port into said reaction chamber for conversion into gaseous products.

7. In a coal gasification process wherein finely divided coal, oxygen and steam are passed into a reaction chamber having a generally circular transverse cross section into which the reactants are introduced through an inlet in one end, wherein the reaction temperature is above 750° C., and from which reaction products are withdrawn from said reaction chamber through an outlet port in the end opposite the inlet end, the improvement comprising introducing into said chamber through a tangential port in the sidewall adjacent the inlet end in a direction tangent to said sidewall and generally normal to the longitudinal axis thereof a gaseous suspension of finely-divided coal and an endothermic gas making fluid containing oxygen, said mixture being introduced at a sufficiently high velocity and in sufficient quantity as to maintain itself by centrifugal force adjacent the whole inner surface of the reactor sidewall, thus forming a separating layer of said finely-divided coal and gas between said sidewall and the reaction zone in the center of said chamber, thereby shielding the walls of said chamber from the heat radiations and simultaneously preheating the powdered coal, removing said coal and fluidizing gas from the outlet end of said chamber and reintroducing it together with a free oxygen-containing gas through the reactant inlet port into said reaction chamber.

8. The process of claim 7 wherein the suspending gas is steam.

9. The process of claim 7 wherein the suspending gas is carbon dioxide.

10. A high temperature carbon gasification chamber comprising, in combination, a refractory-lined frusto-conical chamber having a reactant inlet port in the center of the smaller end for introducing reactant materials in a direction along the longitudinal axis of said chamber; a reactant outlet port centrally located in the larger end of said chamber; a blanketing mixture inlet adjacent and peripheral to the reactant inlet and opening in a direction away from the center of said chamber; and at least one carbon return duct leading from the periphery of the outlet end of said chamber adjacent said outlet port and terminating in the reactant inlet for removing the blanketing mixture from the outlet end of said chamber and transferring it to the reactant inlet line.

11. A high-temperature water gas furnace comprising, in combination, a frusto-conical, refractory-lined chamber; a reactant inlet comprising a venturi in the smaller end of said chamber for injecting reactants into said chamber in a direction along the longitudinal axis thereof; a product outlet port centrally located in the opposite end of said chamber for removing gaseous products from said chamber; at least one tangential inlet port in the sidewall adjacent said inlet port opening in a direction tangent to said sidewall and generally normal to the longitudinal axis thereof; and at least one dust return duct leading from the periphery of the outlet end of said chamber tangent to the side wall at a point adjacent the outlet port and joining the reactant inlet line in the throat of the venturi.

12. A high temperature coal gasification furnace comprising a refractory-lined frusto-conical reaction chamber, the sidewalls of which taper outwardly at such a rate that the transverse cross sectional area increases as the specific volume of gases within said chamber increases; a reactant inlet comprising a venturi extending axially through the smaller end wall of said chamber for introducing reactant materials into said chamber; a product outlet line of greater cross section than said inlet port leading from the center of the larger end of said chamber; a plurality of tangential inlet ports in the sidewall at spaced intervals adjacent the reactant inlet and directed tangentially to said sidewall and generally normal to the longitudinal axis of said chamber; a plurality of coal return ducts leading from the periphery of the outlet end of said chamber in a direction tangent to the sidewalls of said furnace in an area adjacent the product outlet port and leading to the reactant inlet line.

ROBERT G. ATKINSON.

REFERENCES CITED

The following references are of record in the file of this patent:

UNITED STATES PATENTS

| Number | Name | Date |
| --- | --- | --- |
| 858,640 | Welles | July 2, 1907 |
| 1,618,808 | Burg | Feb. 22, 1927 |
| 1,852,968 | Hillhouse | Apr. 5, 1932 |
| 1,869,949 | Szikla et al. | Aug. 2, 1932 |
| 2,302,156 | Totzek | Nov. 17, 1942 |
| 2,302,157 | Totzek | Nov. 17, 1942 |
| 2,344,007 | Totzek | Mar. 14, 1944 |

FOREIGN PATENTS

| Number | Country | Date |
| --- | --- | --- |
| 288,491 | Great Britain | Apr. 12, 1927 |
| 413,130 | Great Britain | July 12, 1934 |